United States Patent
Oh et al.

(10) Patent No.: US 10,283,827 B2
(45) Date of Patent: May 7, 2019

(54) ELECTROCHEMICAL CELL, BATTERY MODULE INCLUDING THE SAME, AND BATTERY PACK INCLUDING THE SAME

(71) Applicant: SAMSUNG ELECTRONICS CO., LTD., Suwon-si (KR)

(72) Inventors: Jae Joon Oh, Seongnam-si (KR); Jeong Sik Ko, Seongnam-si (KR); Hyuk Jae Kwon, Suwon-si (KR); Heung Chan Lee, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 162 days.

(21) Appl. No.: 15/395,372

(22) Filed: Dec. 30, 2016

(65) Prior Publication Data
US 2017/0214105 A1    Jul. 27, 2017

(30) Foreign Application Priority Data
Jan. 21, 2016    (KR) .................. 10-2016-0007547

(51) Int. Cl.
*H01M 4/42* (2006.01)
*H01M 12/08* (2006.01)
(Continued)

(52) U.S. Cl.
CPC ......... *H01M 12/08* (2013.01); *H01M 2/1673* (2013.01); *H01M 4/94* (2013.01);
(Continued)

(58) Field of Classification Search
CPC ...... H01M 12/08; H01M 2/1673; H01M 4/94; H01M 2220/10; H01M 2220/20
See application file for complete search history.

(56) References Cited

U.S. PATENT DOCUMENTS 8,492,052 B2    7/2013 Friesen et al.
8,802,302 B2    8/2014 Nakanishi et al.
(Continued)

FOREIGN PATENT DOCUMENTS

GB    1216147    12/1970
JP    2013058336    3/2013
(Continued)

OTHER PUBLICATIONS

Extended European Search Report—European Patent Application No. 17152290.7 dated May 15, 2017, citing references listed within.
(Continued)

*Primary Examiner* — Jane J Rhee
(74) *Attorney, Agent, or Firm* — Cantor Colburn LLP

(57) ABSTRACT

An electrochemical cell includes: a positive current collector in which an injection part, an ejection part and a passage are defined, where air including an oxygen is injected through the injection part, an exhaust gas is ejected though the ejection part ejecting, and the passage defines a single path which connects the injection part and the ejection part; and a unit cell disposed to be adjacent to the positive current collector. The unit cell includes a positive electrode layer, an active material of which is the oxygen gas, a negative electrode metal layer disposed on an opposite to the positive current collector with respect to the positive electrode layer, and an electrolyte membrane interposed between the positive electrode layer and the negative electrode metal layer.

19 Claims, 15 Drawing Sheets

(51) Int. Cl.
*H01M 2/16* (2006.01)
*H01M 4/94* (2006.01)

(52) U.S. Cl.
CPC .... *H01M 2220/10* (2013.01); *H01M 2220/20* (2013.01); *Y02E 60/128* (2013.01)

(56) References Cited

U.S. PATENT DOCUMENTS

| | | |
|---|---|---|
| 2012/0301810 A1 | 11/2012 | Kawajiri et al. |
| 2014/0162165 A1 | 6/2014 | Song et al. |
| 2014/0212777 A1* | 7/2014 | Hofer ............... H01M 8/04097 429/415 |
| 2015/0140452 A1* | 5/2015 | Park .................... H01M 12/06 429/403 |
| 2015/0340747 A1 | 11/2015 | Kwon et al. |

FOREIGN PATENT DOCUMENTS

| | | |
|---|---|---|
| JP | 5212384 | 6/2013 |
| JP | 2014038770 | 2/2014 |
| KR | 1020140075465 | 6/2014 |

OTHER PUBLICATIONS

K. G. Gallagher, et al., "Energy & Environmental Science", Energy Environ. Sci., (2014),vol. 7, pp. 1555-1563.

\* cited by examiner

ELECTROCHEMICAL CELL, BATTERY MODULE INCLUDING THE SAME, AND BATTERY PACK INCLUDING THE SAME

CROSS-REFERENCE TO RELATED APPLICATION

This application claims priority to Korean Patent Application No. 10-2016-0007547, filed on Jan. 21, 2016, and all the benefits accruing therefrom under 35 U.S.C. § 119, the content of which in its entirety is herein incorporated by reference.

BACKGROUND (a) Field

Exemplary embodiments of the invention relate to an electrochemical cell, a battery module including the electrochemical cell, and a battery pack including the battery module.

(b) Description of the Related Art

Unlike a primary battery that cannot be recharged, a rechargeable battery may be repeatedly charged and discharged. A small-capacity rechargeable battery is widely used for small portable electronic devices such as mobile phones, notebook computers, camcorders, and the like, and a large-capacity rechargeable battery is typically used as a motor-driving power source for hybrid vehicles and electric vehicles.

Recently, among such rechargeable batteries, a metal-air battery using oxygen in air as a positive active material has been actively researched. The metal-air battery is a battery including a negative electrode capable of absorbing/releasing ions and a positive electrode using the oxygen in the air as an active material.

In such a metal-air battery, a reduction/oxidation reaction of the oxygen inflowing from the outside is generated in the positive electrode, the oxidation/reduction reaction of the metal is generated in the negative electrode, and chemical energy generated by such reactions is extracted as electrical energy. The metal-air battery may absorb the oxygen during the discharging and emit the oxygen during the charging. As described above, since the metal-air battery uses the oxygen in the air, the energy density of the battery may be dramatically improved. For example, the metal-air battery may have high energy density of more than that of a conventional lithium ion battery by several times.

Also, because the metal-air battery has a low possibility of ignition due to a high temperature, the metal-air battery has high stability, and is operated by only the absorption/releasing of the oxygen without the use of a medium metal, a possibility of environmental pollution is low. According to these various merits, many studies of the metal-air battery are being currently undertaken.

SUMMARY

Exemplary embodiments of the invention are directed to an electrochemical cell having high energy density and uniform distribution of the oxygen and current density in the positive electrode while effectively supplying the air without increasing a volume of the cell, a battery module including the electrochemical cell, and a battery pack including the battery module.

According to an exemplary embodiment, an electrochemical cell include: a positive current collector in which an injection part, an ejection part and a passage are defined, where air including an oxygen is injected through the injection part, an exhaust gas is ejected through the ejection part, and the passage defines a single path which connects the injection part and the ejection part; and a unit cell disposed to be adjacent to the positive current collector. In such an embodiment, the unit cell includes a positive electrode layer, where the oxygen is an active material thereof, a negative electrode metal layer disposed opposite to the positive current collector with respect to the positive electrode layer, and an electrolyte membrane interposed between the positive electrode layer and the negative electrode metal layer.

In an exemplary embodiment, the unit cell may be provided as a pair and disposed opposite to each other with respect to the positive current collector.

In an exemplary embodiment, the passage may have a meandering shape.

In an exemplary embodiment, the positive electrode layer may contact a surface of the positive current collector.

In an exemplary embodiment, At least a part of the passage may be opened toward the surface of the positive electrode layer.

In an exemplary embodiment, the positive current collector may include a first frame including a plurality of first protrusions and a second frame including a plurality of second protrusions, and the first protrusions and the second protrusions may be disposed to be spaced apart from each other and opposite to each other.

In an exemplary embodiment, the first protrusions and the second protrusions may be alternately disposed along a first direction.

In an exemplary embodiment, the first protrusions and the second protrusions may have shapes corresponding to each other.

In an exemplary embodiment, the negative electrode metal layer may include at least one selected from lithium, sodium, potassium, rubidium, cesium, zinc, calcium, magnesium, iron, and aluminum, and a combination thereof.

In an exemplary embodiment, the electrolyte membrane may include a separation layer which has conductivity for a metal ion and blocks the oxygen, and an electrolyte which transmits the metal ion.

In an exemplary embodiment, the separation layer may include a porous film, and the electrolyte may be impregnated in pores of the porous film.

In an exemplary embodiment, the unit cell may further include a negative current collector disposed opposite to the electrolyte membrane with respect to the negative electrode metal layer.

In an exemplary embodiment, the unit cell may further include a gas diffusion layer disposed between the positive electrode layer and the positive current collector, and a first surface of the gas diffusion layer may contact the positive current collector.

In an exemplary embodiment, the positive electrode layer, the negative electrode metal layer and the electrolyte membrane are bent to cover at least one of the remaining surfaces of the gas diffusion layer except for the first surface thereof.

In an exemplary embodiment, the gas diffusion layer may be provided in plural and spaced apart spaced apart from each other, and the positive electrode layer, the negative electrode metal layer and the electrolyte membrane may be repeatedly bent to cover all of the remaining surface surfaces of each gas diffusion layer except for the first surface thereof.

In an exemplary embodiment, the positive electrode layer, the negative electrode metal layer and the electrolyte membrane may be bent by about 180 degrees at a position between adjacent gas diffusion layers in a way such that portions of the negative electrode metal layer are disposed to be adjacent to each other.

In an exemplary embodiment, the electrochemical cell may further include a negative current collector disposed opposite to the electrolyte membrane with respect to the negative electrode metal layer, and the positive electrode layer, the negative electrode metal layer, the electrolyte membrane and the negative current collector may be bent by about 180 degrees at a position between the adjacent gas diffusion layers in a way such that portions of the negative current collector are disposed to be adjacent to each other.

In an exemplary embodiment, the unit cell may be provided as a pair and disposed opposite to each other with respect to the positive current collector.

According to another exemplary embodiment, a battery module includes: the above-mentioned electrochemical cell, which is provided in plural and disposed to be adjacent to each other; a supply manifold connected with the passage of each electrochemical cell to supply the air; and an exhaust manifold connected with the passage of each electrochemical cell to exhaust the exhaust gas.

According to another exemplary embodiment, a battery pack includes the above-mentioned battery module, which is provided in plural and disposed to be adjacent to each other; a supply part connected with the supply manifold of each battery module; and an exhaust part connected with the exhaust manifold of each battery module.

In exemplary embodiments, the electrochemical cell, the battery module, and the battery pack may effectively supply the air without increasing the volume of the cell.

In exemplary embodiments of the electrochemical cell, the battery module and the battery pack, the oxygen and the current density may be uniformly distributed in the positive electrode, and have high energy density.

BRIEF DESCRIPTION OF THE DRAWINGS

These and/or other features of the invention will become apparent and more readily appreciated from the following detailed description of embodiments thereof, taken in conjunction with the accompanying drawings, in which.

DETAILED DESCRIPTION

Figure 1:
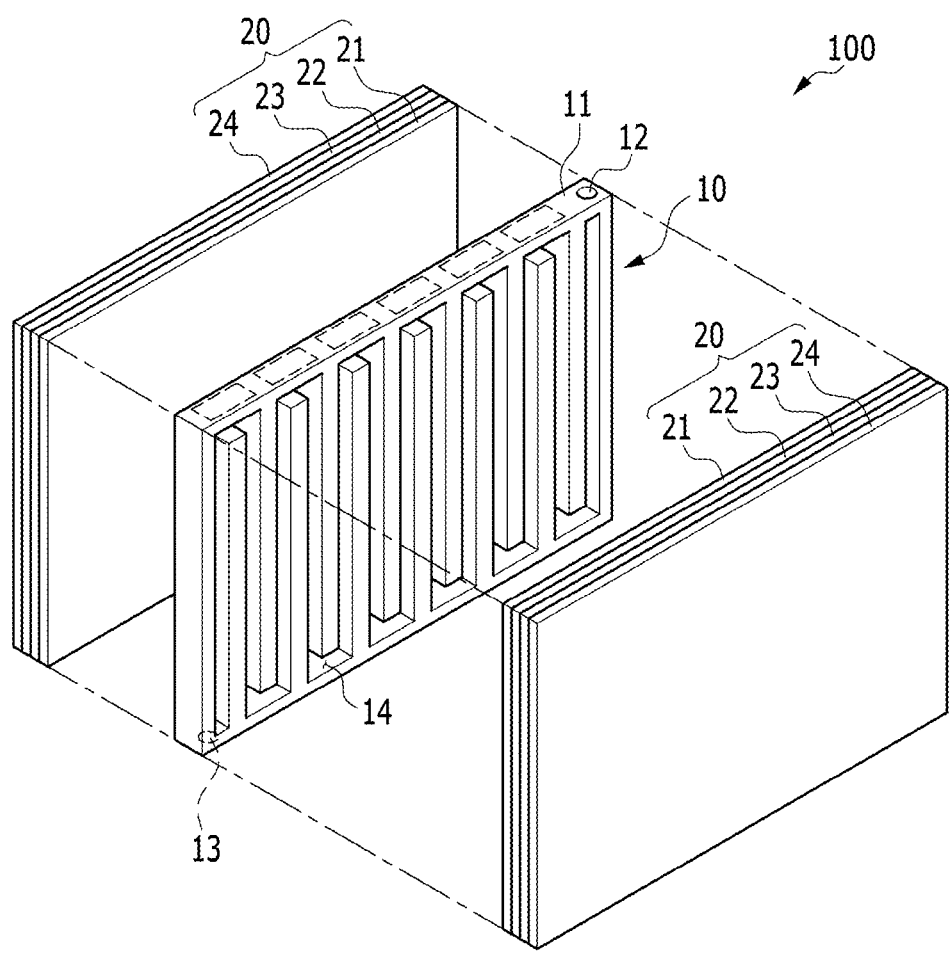
FIG. 1 is an exploded perspective view of an electrochemical cell according to an exemplary embodiment of the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Herein, "air" includes at least oxygen ($O_2$), however it is not limited to atmospheric air, and is defined to be made of a combination of an oxygen gas having an oxygen fraction of various ranges, or pure oxygen gas.

Hereinafter, a structure of an electrochemical cell according to an exemplary embodiment of the invention will be described with reference to FIG. 1 to FIG. 3.

Figure 2:
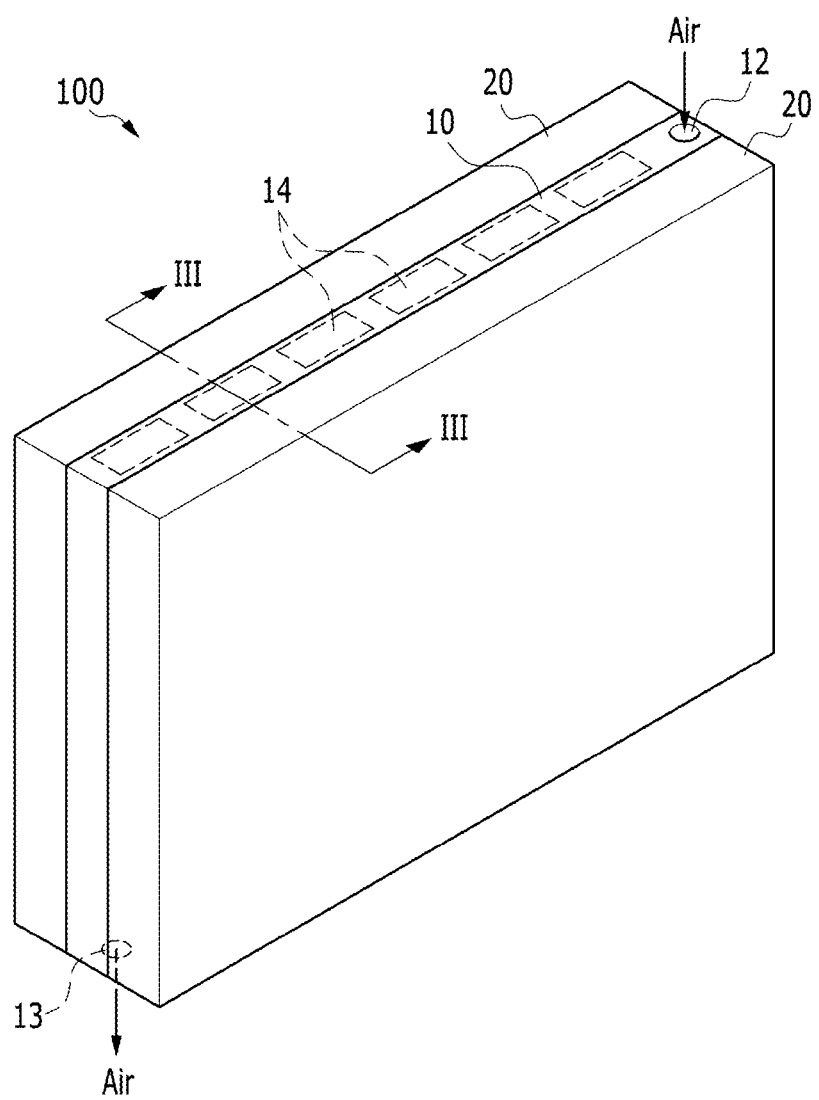
FIG. 2 is a perspective view of an electrochemical cell according to an exemplary embodiment of the invention.
Figure 3:
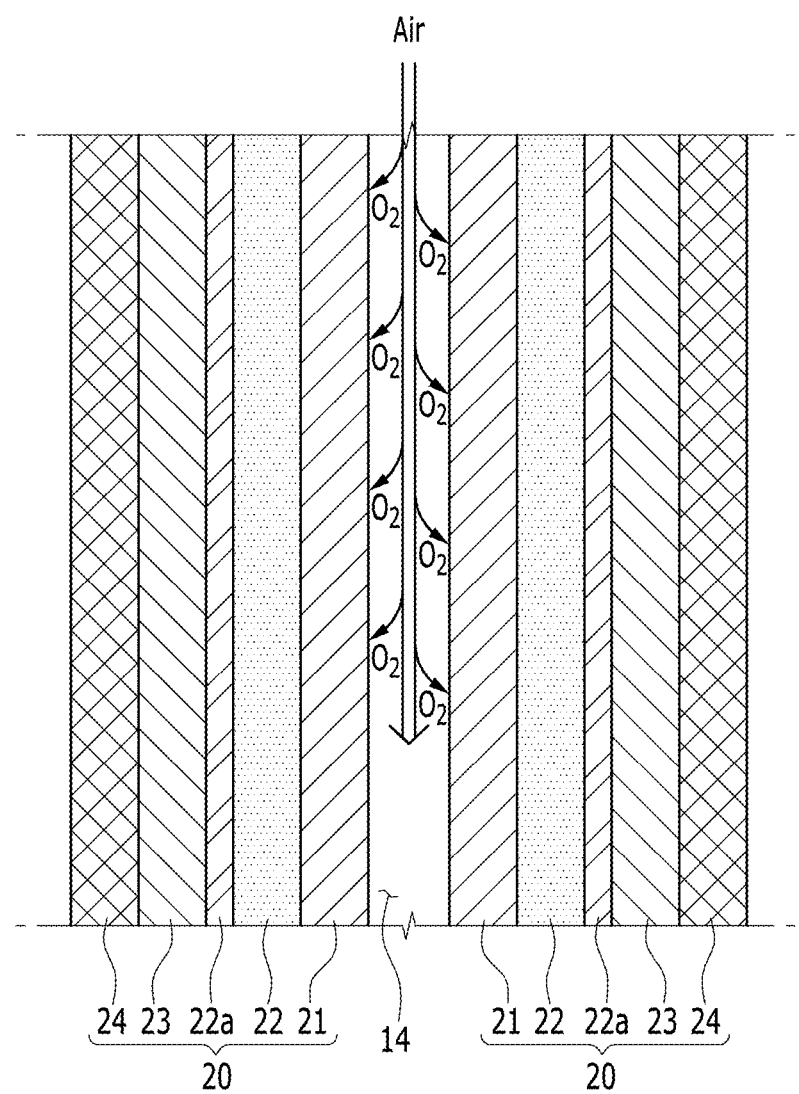
FIG. 3 is a cross-sectional view taken along line III-III of FIG. 2.

FIG. 1 is an exploded perspective view of an electrochemical cell according to an exemplary embodiment of the invention, FIG. 2 is a perspective view of an electrochemical cell according to an exemplary embodiment of the invention, and FIG. 3 is a cross-sectional view taken along line III-III of FIG. 2.

Referring to FIG. 1 and FIG. 2, an exemplary embodiment of an electrochemical cell 100 includes a negative electrode metal layer 23 including or made of a metal, a positive electrode layer 21 using oxygen as a positive electrode active material, and an electrolyte membrane 22. In such an embodiment, electrochemical cell 100 may be a metal-air battery in which an electrolyte in the electrolyte membrane 22 may absorb or release a metal ion in an electrochemical reaction.

The electrochemical cell 100 includes a positive current collector 10 in which a passage 14 is defined, and a pair of unit cells 20 disposed opposite to, or to face, each other with respect to the positive current collector 10 interposed therebetween. Each of the unit cells 20 includes the positive electrode layer 21, the negative electrode metal layer 23, the electrolyte membrane 22 and the negative current collector 24.

The positive current collector 10 includes a frame 11 that defines a body, an injection part (e.g., an injection hole) 12 defined at a side of the frame 11 to be injected with the air, and an ejection part (e.g., an ejection hole) 13 defined at another side thereof to exhaust an exhaust gas outside the cell.

The frame 11 may be a structure of a plate type having a predetermined thickness. The frame 11 may use, for example, a metal plate such as stainless steel, nickel, and aluminum, and thereby the positive current collector 10 maintains a predetermined external shape and volume. However, the invention is not limited thereto.

In such an embodiment, where the frame 11 may be continuously exposed to the air, an anti-oxidation film may be disposed or formed on a surface of the part of which the injection part 12 and the ejection part 13 are defined and an inner wall that defines the passage 14. The anti-oxidation film may be a film including or made of an organic material, an inorganic material, an organic/inorganic mixture, or an oxidation resistant metal or alloy.

The cross-section of the frame 11 may have at least one of various shapes such as square, rhombus, triangle, hexagon, circle, and oval depending on a path of the passage 14 defined inside the frame 11, a size of the passage 14, and a shape of the unit cell 20. In one exemplary embodiment, for example, the cross-section of the frame 11 may be a rectangle, as shown in FIG. 1.

In such an embodiment, the passage 14 is a space defined inside the frame 11, and the injection part 12 and the ejection part 13 are connected with each other by the passage 14, as shown in FIG. 1.

The passage 14 is defined inside the frame 11, and at least a part thereof may be opened toward a surface of the positive electrode layer 21. In an exemplary embodiment, the passage 14 may be opened toward the surfaces of a pair of positive electrode layers 21 facing each other. In such an embodiment, the passage 14, as shown in FIG. 1, may be an opened passage having a shape such that the surface toward each positive electrode layer 21 is all opened.

In such an embodiment, where the passage 14 has the opened structure toward the positive electrode layer 21, the oxygen may be continuously supplied to the adjacent positive electrode layer 21 while the air injected to the injection part 12 is guided and flows toward the ejection part 13 along the path of the passage 14.

In an exemplary embodiment, the passage 14 may define a single path that is not branched and connects the injection part 12 and the ejection part 13. In such an embodiment, the injection part 12 and the ejection part 13 may be connected with each other by a single passage 14 that is not branched.

In such an embodiment, as described above, by guiding the air through the passage 14 along a single path, the oxygen transmitted to the positive electrode layer 21 of the electrochemical cell 100 may be linearly and uniformly distributed along the path defined by the passage 14, and accordingly, the current density inside the electrochemical cell 100 may be linearly and uniformly distributed.

In such an embodiment, the injection part 12 and the ejection part 13 are respectively defined or formed on the upper side and the lower side of the frame 11, but not being limited thereto. In an alternative exemplary embodiment, the injection part 12 and the ejection part 13 may be defined on the upper side or the lower side, and the passage 14 may define a path having a meandering shape that connects the injection part 12 and the ejection part 13.

In such an embodiment, by providing the passage 14 having the meandering shape, a ratio of the passage 14 volume to the entire volume of the positive current collector 10 may be maximized while the entire volume of the positive current collector 10 is not increased. In such an embodiment, the electrochemical cell 100 having high energy density may be provided without a volume increase of the positive current collector 10 depending on the passage 14 expanding design.

However, the detailed shape of the passage 14 according to an exemplary embodiment of the invention and the formation direction of the passage 14 are always limited thereto, and a design thereof may be variously changed depending on the kind of the frame 11, the entire shape of the electrochemical cell 100, and the volume of the passage 14. The detailed design issues of the passage 14 for the various shapes of the passage 14 and the formation of the passage 14 through the design of the frame 11 according to an exemplary embodiment and the uniform discharge characteristic linearly appearing by connecting the passage 14 by a single path will be described later in greater detail.

In an exemplary embodiment of the electrochemical cell 100, a pair of unit cells 20, as shown in FIG. 1, is disposed opposite to, e.g., to face, each other with respect to the positive current collector 10 interposed therebetween. In an exemplary embodiment, a pair of unit cells 20 may be disposed to be positioned symmetrically to each other with respect to the positive current collector 10. In an exemplary embodiment, in each of the unit cells 20, the positive electrode layer 21, the electrolyte membrane 22, the negative electrode metal layer 23 and a negative current collector 24 are sequentially disposed from the position adjacent to the positive current collector 10.

In an exemplary embodiment, the positive electrode layer 21, the electrolyte membrane 22, the negative electrode metal layer 23 and the negative current collector 24 are respectively stacked with a film shape or a plate shape in each of the unit cells 20, and thereby the unit cells 20 may have the film shape or the plate shape as a whole. In an exemplary embodiment, where the unit cells 20 are disposed in a pair to face each other with respect to the positive current collector 10 interposed therebetween, the volume increase of the electrochemical cell 100 may be minimized as the unit cells 20 have the film shape or the plate shape.

However, the shape of the unit cell 20 according to an exemplary embodiment of the invention is not limited thereto. In an alternative exemplary embodiment, the positive electrode layer 21, the electrolyte membrane 22, the negative electrode metal layer 23 and the negative current collector 24 of at least one of the unit cells 20 may have a repeatedly folded structure. The shape of such an alternative exemplary embodiment of the unit cell 20 will be described later.

FIG. 3 is a cross-sectional view of the passage 14 passing through a region (a dotted line region of FIG. 1 and FIG. 2) adjacent to the upper surface of the electrochemical cell 100 and a pair of unit cells 20 adjacent to the passage 14 taken along line III-III.

Referring to FIG. 3, the positive electrode layer 21 is positioned immediately next to the passage 14, and the passage 14 is opened toward the positive electrode layer 21. Although not shown in FIG. 3, a part of the frame 11, on which the passage 14 is not defined, contacts the positive electrode layer 21. In such an embodiment, the positive electrode layer 21 is disposed to contact the positive current collector 10, and the oxygen flowing along the passage 14 through the passage 14 having the opened type of structure may be effectively or quickly diffused into the positive electrode layer 21.

In such an embodiment, the frame 11 contacting the positive electrode layer 21 may function as the positive current collector 10 for supplying the electron used for the oxygen reduction reaction in the positive electrode layer 21 to the positive electrode layer 21 and for collecting the electron generated by the oxygen oxidation reaction.

In an exemplary embodiment, the positive electrode layer 21 may include a material using the oxygen as the positive electrode active material, e.g., a conductive material. In such an embodiment, the conductive material may be porous. Accordingly, a material having porosity and conductivity may be used as a material of the positive electrode layer 21 without limitation. In one exemplary embodiment, for example, the positive electrode layer 21 may include a carbon-based material having porosity. In such an embodiment, carbon black, graphite, graphene, activated acids, carbon fibers, carbon nanotubes, carbon nanorods, or any kinds of two-dimensional materials may be used as the carbon-based material. In an alternative exemplary embodiment, a metallic conductive material such as a metal fiber or a metal mesh may be used as a material of the positive electrode layer 21. Further, a metallic powder such as copper, silver, nickel, and aluminum may be included in the positive electrode layer 21. An organic conductive material such as polyphenylene derivatives may be used as a material of the positive electrode layer 21. The conductive materials described above may be used alone or mixed to be used as a material of the positive electrode layer 21.

In an exemplary embodiment, the positive electrode layer 21 may further include a catalyst for the oxidation/reduction of the oxygen. In one exemplary embodiment, for example, a noble-metal-based catalyst such as platinum, gold, silver, palladium, ruthenium, rhodium, and osmium, an oxide-based catalyst such as manganese oxide, iron oxide, cobalt oxide, and nickel oxide, or an organic metal based-catalyst such as cobalt phthalocyanine may be used as the catalyst to be added in the positive electrode layer 21, but not being limited thereto. In an exemplary embodiment, any catalyst known in the art may be used the catalyst to be added in the positive electrode layer 21 as long as the oxidation/reduction of the oxygen may occur.

In such an embodiment, the catalyst may be supported on a carrier. The carrier may be an oxide, zeolite, a clay-based mineral, or carbon. The oxide may include at least one of alumina, silica, zirconium oxide and titanium dioxide, for example. In such an embodiment, the oxide may be an oxide including at least one selected from cerium, praseodymium, samarium, europium, terbium, thulium, ytterbium, antimony, bismuth, vanadium, chromium, manganese, iron, cobalt, nickel, copper, niobium, molybdenum, and tungsten.

The carbon may be carbon black such as ketjen black, acetylene black, panel black, and lamp black, and graphite such as natural graphite, artificial graphite, expanded graphite, graphite acids, and carbon fibers, but being not limited thereto. Alternatively, any material that may be used as a carrier in the art may be used as the carbon.

The positive electrode layer 21 may further include a binder. The binder may include a thermoplastic resin or a thermosetting resin. In one exemplary embodiment, for example, the binder may include at least one selected from polyethylene, polypropylene, polytetrafluoroethylene ("PTFE"), polyvinylidene fluoride ("PVDF"), styrene-butadiene rubber, a tetrafluoroethylene-perfluoroalkyl vinyl ether copolymer, a vinylidene fluoride-hexafluoro propylene copolymer, a vinylidene fluoride-chlorotrifluoroethylene ethylene copolymer, an ethylene-tetrafluoroethylene copolymer, poly(chlorotrifluoroethylene) ethylene, a vinylidene fluoride-pentafluoropropylene copolymer, a propylene-tetra-fluoroethylene copolymer, an ethylene-chlorotrifluoroethylene ethylene copolymer, a vinylidene fluoride-hexafluoropropylene-tetrafluoroethylene copolymer, a vinylidene fluoride-perfluoro methyl vinylether-tetrafluoroethylene copolymer, an ethylene-acryl copolymer, and a combination thereof, but not being limited thereto. Alternatively, any material that may be used as a binder in the art may be used as the binder of the positive electrode layer 21.

In an exemplary embodiment, the positive electrode layer 21, for example, may be formed, after mixing the oxygen oxidation/reduction catalyst, the conductive material and the binder, by adding an appropriate solvent to form a positive electrode slurry and coating and drying the positive electrode slurry on a current collector surface, or by compressing and molding the positive electrode slurry to the current collector to improve electrode density. In an exemplary embodiment, where the positive electrode layer 21 includes a lithium oxide, the oxygen oxidation/reduction catalyst may be omitted. In an exemplary embodiment, two or more pores of various sizes are formed in the positive electrode layer 21, such that byproducts by the reduction reaction of the oxygen may not be blocked in the pores inside the porous material and adhered to the positive electrode layer 21 as a type of film, and simultaneously the oxygen may be smoothly transported to the positive electrode layer 21.

The negative electrode metal layer 23 is disposed opposite to, e.g., to face, the positive current collector 10 (e.g., on an outer surface of the positive current collector 10) with respect to the positive electrode layer 21 interposed therebetween. The negative electrode metal layer 23 has a function of absorbing/emitting the metal ion, and for example, may include any one selected from lithium, sodium, potassium, rubidium, cesium, zinc, calcium, magnesium, iron, and aluminum, or alloys thereof.

The negative electrode metal layer 23 may further or additionally include a binder, e.g., the binder of the above-described positive electrode layer 21. The kind and the features of the binder is the same as that of the positive electrode layer 21 described above, and any repetitive detailed description thereof will be omitted.

The electrolyte membrane 22 is interposed between the positive electrode layer 21 and the negative electrode metal layer 23.

The electrolyte membrane 22 has a function of transmitting the metal ion to the positive electrode layer 21. In an exemplary embodiment, the electrolyte membrane 22 may include an electrolyte formed by dissolving a metal salt in the solvent. The electrolyte may generally be in a solid state including an organic electrolyte, an inorganic electrolyte, or a composite electrolyte thereof, an ion liquid, or an ion gel, and is formed to be bent in a way to be described later. In one exemplary embodiment, for example, the metal salt may be a lithium salt such as $LiN(SO_2CF_2CF_3)_2$, $LiN(SO_2C_2F_5)_2$, $LiClO_4$, $LiBF_4$, $LiPF_6$, $LiSbF_6$, $LiAsF_6$, $LiCF_3SO_3$, $LiN(SO_2CF_3)_2$, $LiC(SO_2CF_3)_3$, $LiN(SO_3CF_3)_2$, $LiC_4F_9SO_3$, $LiAlCl_4$, or lithium-bis-(trifluoromethane sulfonyl)imide (LiTFSI), and other metal salts such as $AlCl_3$, $MgCl_2$, NaCl, KCl, NaBr, KBr, $CaCl_2$, and the like may be added to the lithium salt. The solvent may be any material capable of solving the lithium salt and the metal salt.

In an exemplary embodiment, the electrolyte membrane 22 may include a separation layer 22a having conductivity for the metal ion while preventing the penetrating of the oxygen. The separation layer 22a may be an organic separation layer that may be bent. In one exemplary embodiment, for example, the separation layer may include a porous film of a polymer non-woven fabric such as a polypropylene non-woven fabric material or a polyphenylene sulfide non-woven fabric material, or an olefin-based resin such as polyethylene or polypropylene.

The separation layer and the electrolyte may be respectively formed as separate layers. Alternatively, the electrolyte membrane 22 may be integrally formed as a single layer by impregnating the electrolyte in the pores of the porous separation layer 22a. In one exemplary embodiment, for example, the electrolyte membrane 22 may be formed by impregnating the electrolyte formed by mixing the polyethylene oxide ("PEO") and the LiTFSI in the pores of the porous separation layer.

The negative current collector 24 may be disposed opposite to, e.g., to face, the electrolyte membrane 22 (e.g., on an outer surface of the electrolyte membrane 22) with respect to the negative electrode metal layer 23 interposed therebetween. In an exemplary embodiment, the negative current collector 24 may be disposed at the farthest position from the positive current collector 10 among the elements or constitutions of the unit cell 20. The negative current collector 24 is not particularly limited as long as it has conductivity. In one exemplary embodiment, for example, the negative current collector 24 may include or be made of copper, stainless, nickel, aluminum, iron, titanium, or alloys thereof. In an exemplary embodiment, the negative current collector 24 may have a plate shape as shown in FIG. 1 to FIG. 3, but not being limited thereto. Alternatively, the negative current collector 24 may be a shape of a mesh or a grid.

A general electrochemical cell includes or is made of one unit body including the positive current collector, the positive electrode, the electrolyte membrane, the negative electrode and the negative current collector. However, in a conventional metal-air battery, because of the air supply passage having a relatively large volume, when disposing two or more unit bodies to be adjacent to each other, the volume thereof may be substantially high.

In an exemplary embodiment of the electrochemical cell 100 according to the invention, a pair of unit cells 20 are disposed opposite to, e.g., to face, each other with respect to the positive current collector 10, as shown in FIG. 1. Accordingly, by configuring the oxygen supply to both unit cells 20 by using a single passage 14, the electrochemical cell 100 having high energy density with the same volume compared with the general electrochemical cell may be effectively provided.

In such an embodiment, a slim and/or compact battery module or battery pack may be realized by configuring a battery module or a battery pack by disposing two or more electrochemical cells 100 to be adjacent.

According to an exemplary embodiment, the electrochemical cell 100 may have high energy density for the same volume compared with a conventional cell.

Next, various alternative exemplary embodiments of the positive current collector of the electrochemical cell, according to the invention, will be described with reference to FIG. 4 to FIG. 7.

Figure 4:
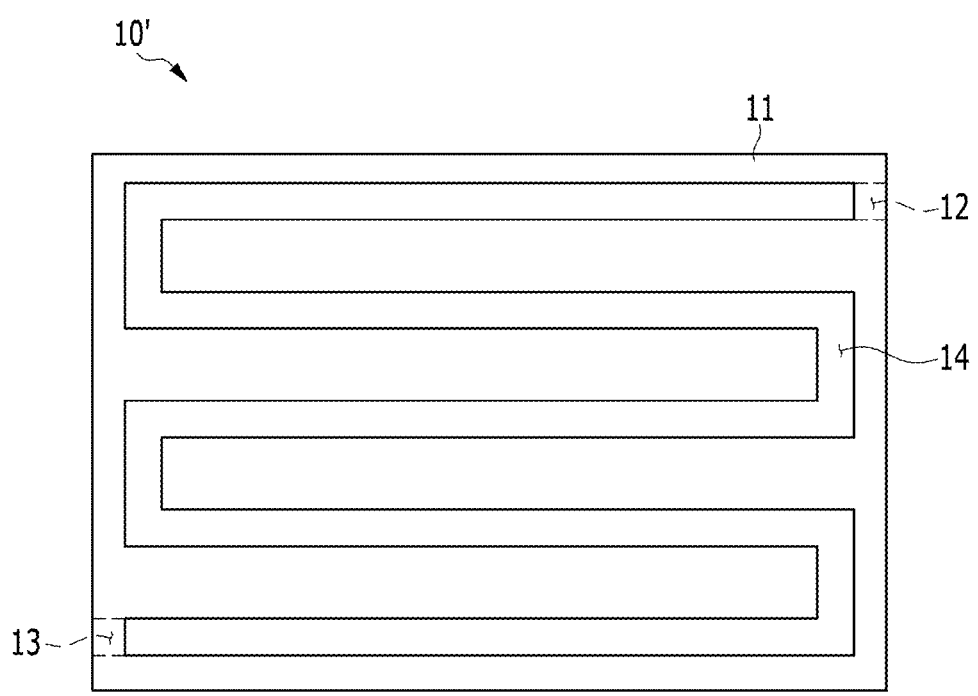
FIG. 4 to FIG. 7 are views showing various alternative exemplary embodiments of a positive current collector of an electrochemical cell, according to the invention.
Figure 5:
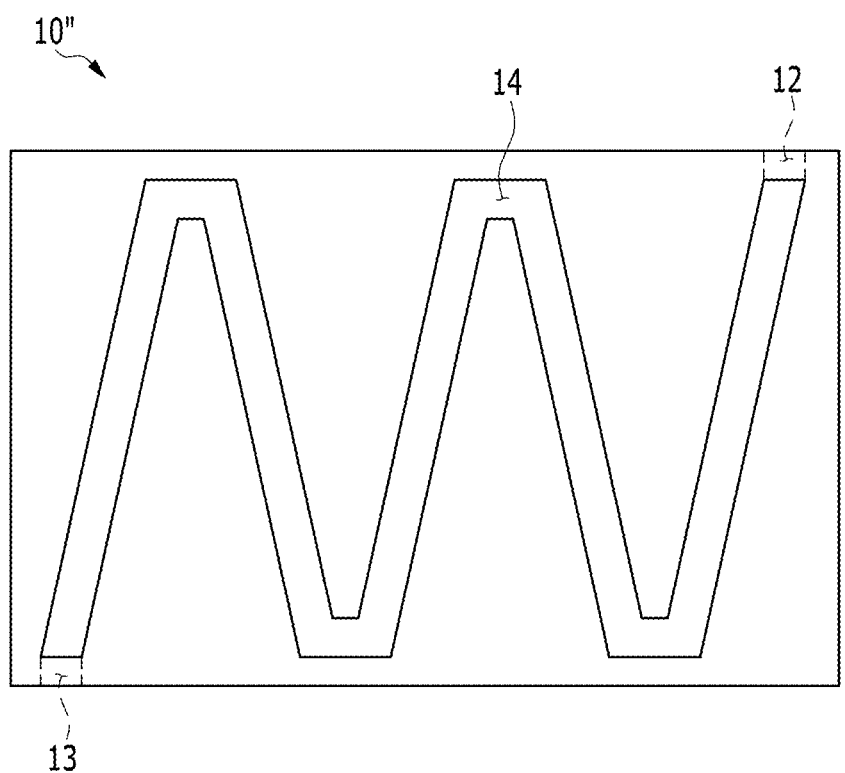

FIG. 4 is a view showing a positive current collector 10' of the electrochemical cell according to an alternative exemplary variation, and FIG. 5 is a view showing a positive current collector 10" of the electrochemical cell according to another alternative exemplary variation.

In an exemplary embodiment of the positive current collector 10' of the electrochemical cell, as shown in FIG. 4, the injection part 12 and the ejection part 13 are defined on opposing sides of the frame 11, and the passage 14 defines as a single path that connects the injection part 12 and the ejection part 13.

In an alternative exemplary embodiment of the positive current collector 10" of the electrochemical cell, as shown in FIG. 5, the detailed meandering pattern of the passage 14 may be formed in a way that is different from that shown in FIG. 1.

In an exemplary embodiment of the positive current collector 10, the positions of the injection part 12 and the ejection part 13, the meandering pattern of the passage 14, the meandering direction, and the like in the positive current collectors 10' or 10" may be variously modified depending on the connection relationship with the usage of the electrochemical cell 100, the shape of the electrochemical cell 100, an air supply device, or an exhaust gas device.

Figure 6:
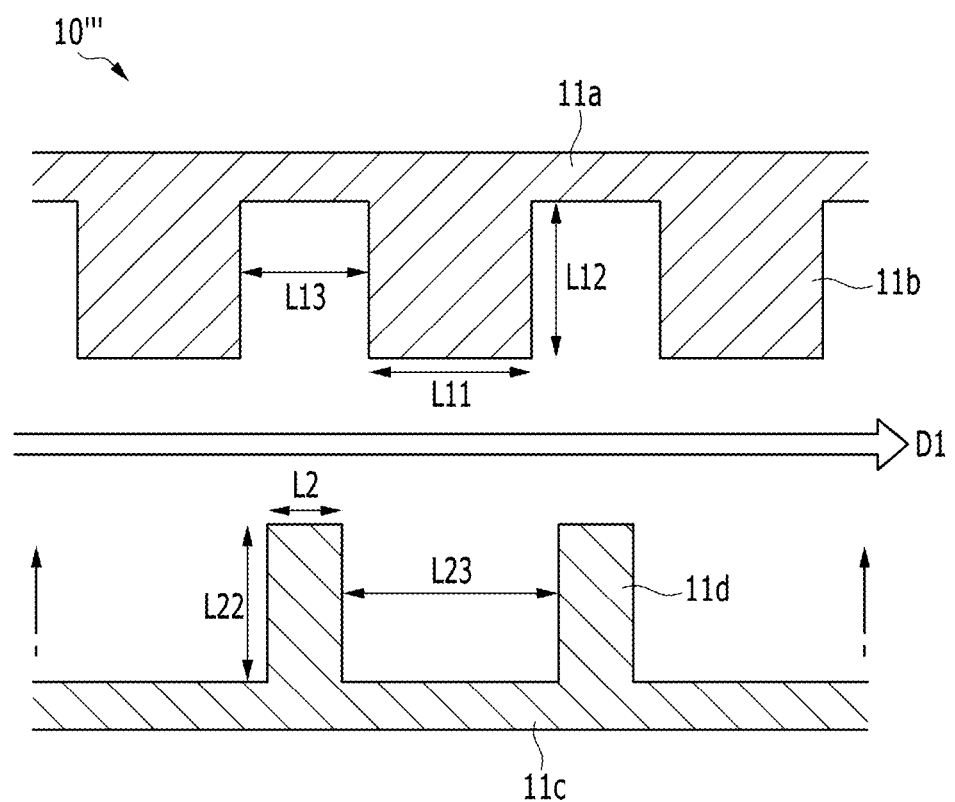
Figure 7:
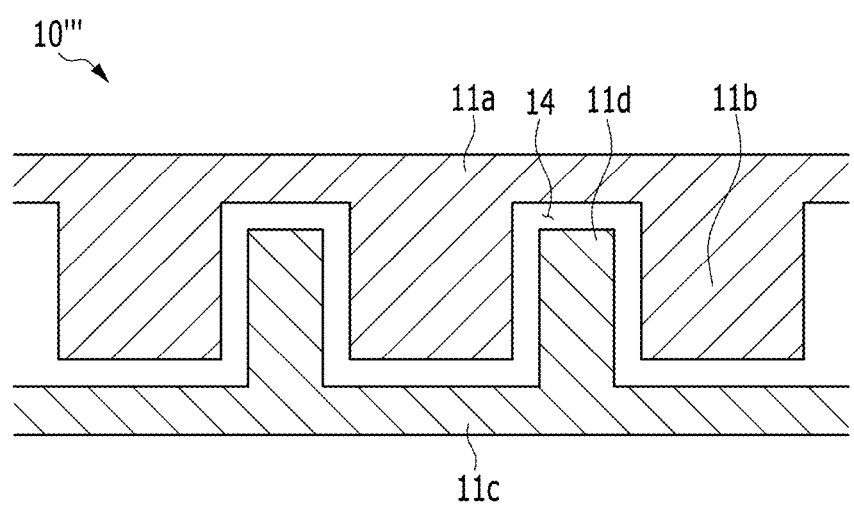

FIG. 6 is a view showing a first frame and a second frame of a positive current collector 10''' of the electrochemical cell according to another alternative exemplary variation, and FIG. 7 is a view showing forming the first frame and the second frame of FIG. 6 to be adjacent to each other.

Referring to FIG. 6 and FIG. 7, an exemplary embodiment of the positive current collector 10''' of the electrochemical cell includes a first frame 11a including a plurality of first protrusions 11b and a second frame 11c including a plurality of second protrusions 11d.

In an exemplary embodiment, the frame 11 formed of the plate-type structure of a single body in the positive current collector 10 as described above. Alternatively, as shown in FIGS. 6 and 7, the frame may be divided into the first frame 11a and the second frame 11c in the positive current collector 10'''.

The first frame 11a and the second frame 11c are separated or spaced apart from each other, but the surfaces formed with the protrusions are disposed opposite to, e.g., to face, each other, and the first protrusions 11b and the second protrusions 11d are alternately disposed along a first direction D1, e.g., a direction parallel to the unit cells 20.

Referring to FIG. 7, the volume of each first protrusion 11b may be larger than the volume of each second protrusion 11d, but not being limited thereto. Alternatively, the volumes of the first protrusion 11b and the second protrusion 11d may be variously modified.

In such an embodiment, as shown in FIG. 7, by disposing the first frame 11a and the second frame 11c to be adjacent, the space corresponding to the volume difference of the first protrusion 11b and the second protrusion 11d may function as the passage 14, and the volume of the formed passage 14 may be variously controlled depending on the electrochemical reaction condition.

In an exemplary embodiment, the first protrusion 11b and the second protrusion 11d may be formed with shapes corresponding to each other. In one exemplary embodiment, for example, the first protrusion 11b and the second protrusion 11d, as shown in FIG. 7, may have the rectangular cross-section, but not being limited thereto. Alternatively, the first protrusion 11b and the second protrusion 11d may have at least one of various shapes such as a triangular shape, a hexagonal shape, and an island shape. By providing the first protrusion 11b and the second protrusion 11d of the corresponding shape, as shown in FIG. 7, the width of the passage 14 may be uniform.

In such an embodiment of the positive current collector 10''', by providing the passage 14 through the frame that is divided into the first frame 11a and the second frame 11c, the positive current collector 10 having the function described above may be realized.

Next, the electrochemical cell according to an alternative exemplary embodiment will be described with reference to FIGS. 8A and 8B, and FIG. 9.

Figure 8A:
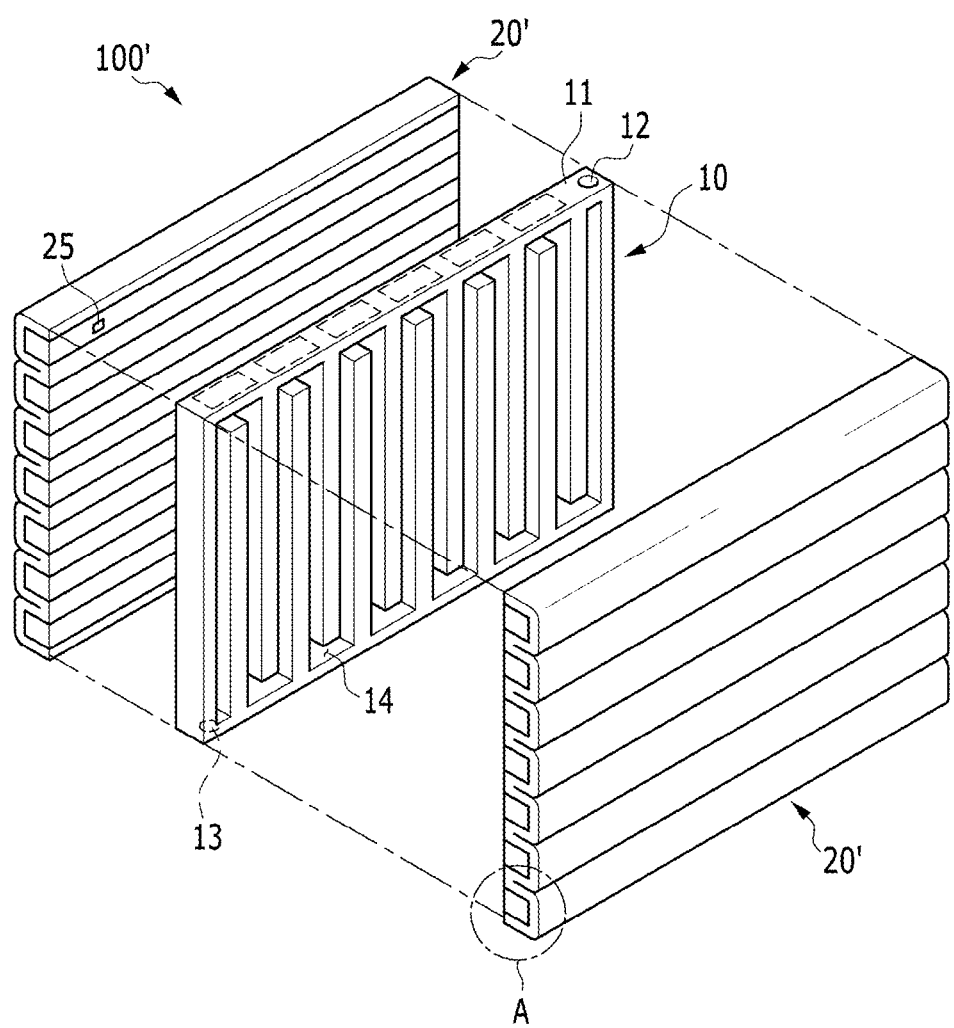
FIG. 8A is an exploded perspective view showing an electrochemical cell according to an alternative exemplary embodiment.
Figure 8B:
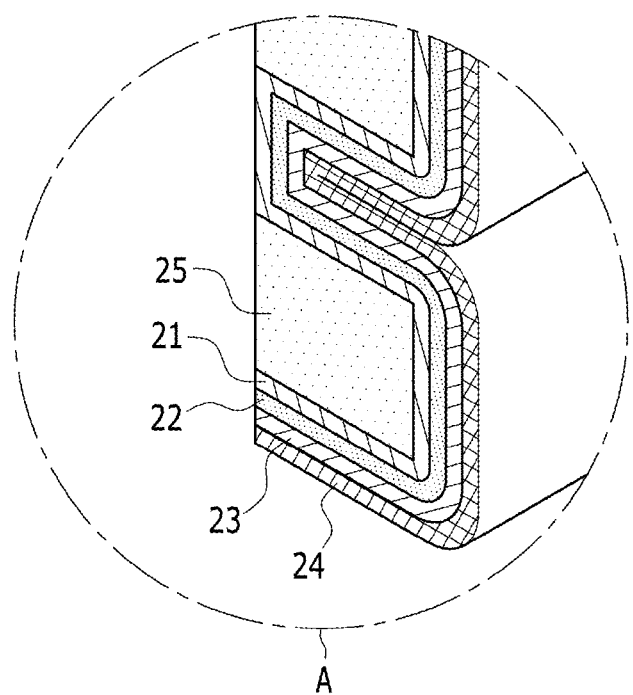
FIG. 8B is an enlarged view of the encircled portion A of FIG. 8A.
Figure 9:
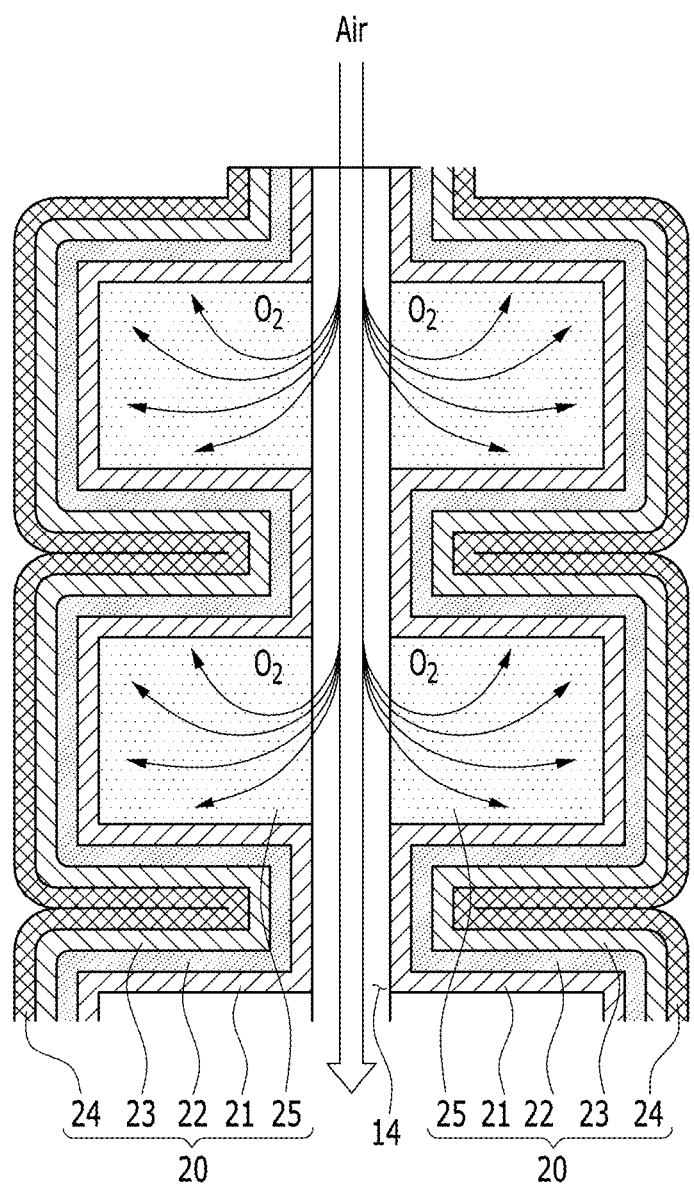
FIG. 9 is a cross-sectional view of an electrochemical cell according to another alternative exemplary embodiment of the invention.

FIG. 8A is an exploded perspective view of an electrochemical cell according to an alternative exemplary embodiment, FIG. 8B is an enlarged view of the encircled portion A of FIG. 8A, and FIG. 9 is a cross-sectional view of an electrochemical cell according to an alternative exemplary embodiment. FIG. 9 is a cross-sectional view of the electrochemical cell taken along the vertical direction of the passage 14 shown in FIG. 8A as a center axis, and a pair of unit cells 20' are disposed opposite to, e.g., to face, each other with respect to the passage 14.

In an exemplary embodiment, the electrochemical cell 100' is substantially the same as the exemplary embodiments of the electrochemical cell 100 described above, except that a pair of unit cells 20' has a shape that is repeatedly curved several times along a length or height direction of the positive current collector 10 are disposed opposite to, e.g., to face, each other with respect to the positive current collector 10 interposed therebetween.

In such an embodiment, as shown in FIGS. 8A to 9, the unit cell 20' further includes a gas diffusion layer 25 disposed between the positive electrode layer 21 and the positive current collector 10.

The gas diffusion layer 25 absorbs the oxygen in the air flowing along the passage 14 to be provided to the positive electrode layer 21. For this, the gas diffusion layer 25 may have the porous structure to smoothly diffuse the oxygen.

In another exemplary embodiment, the gas diffusion layer 25 may include at least one of a carbon paper using carbon fiber, a carbon cloth, a carbon felt, a foamed metal, or a metal fiber mat of a sponge phase, or combinations thereof, and has high electrical conductivity.

A surface, e.g., a first surface 25a, of the gas diffusion layer 25 may contact the surface of the positive current collector 10. Accordingly, the oxygen may be easily diffused from the passage 14 to the gas diffusion layer 25.

In an exemplary embodiment, as shown in FIGS. 8A and 8B, the gas diffusion layer 25 may cover the positive current collector 10. In such an embodiment, the gas diffusion layer 25 may have a bar shape having the rectangular cross-section, but not being limited thereto. Alternatively, the gas diffusion layer 25 may have a rod shape having the cross-section including the curved line such as an arcuate shape as well as the polygon such as the triangle, the square, the rhombus and the hexagon.

The positive electrode layer 21, the negative electrode metal layer 23 and the electrolyte membrane 22 may be bent to enclose at least one of the surfaces of the gas diffusion layer 25 except for the first surface 25a of the gas diffusion layer 25. In such an embodiment, as shown in FIGS. 8A and 8B, the laminated body, in which the positive electrode layer 21, the electrolyte membrane 22 and the negative electrode metal layer 23 are sequentially laminated, may be bent to cover all the remaining surfaces of the gas diffusion layer 25 except for the first surface 25a.

In such an embodiment, as shown in FIGS. 8A and 8B, a plurality of gas diffusion layers 25 are disposed to be separated or spaced apart from each other, and the laminated body may be bent several times to enclose all the remaining surfaces of the gas diffusion layers 25 except for the first surface 25a thereof.

In such an embodiment, as described above, the gas diffusion layer 25 is disposed between the positive current collector 10 and the positive electrode layer 21, and the surface of the gas diffusion layer 25 is enclosed by the laminated body in which the positive electrode layer 21, the electrolyte membrane 22 and the negative electrode metal layer 23 are sequentially laminated, thereby widening the contact area of the positive electrode layer 21 and the gas diffusion layer 25. In such an embodiment, the oxygen may be diffused into the positive electrode layer 21 with a wider area, compared with a case that the gas diffusion layer 25 simply covers the entire positive current collector 10. In such an embodiment, every time the laminated body is bent, as shown in FIG. 9, the contact area of the positive electrode layer 21 and the gas diffusion layer 25 is widened, and the bending times and the bending direction of the laminated body may be variously determined depending on the volume of the electrochemical cell 100', and the various devices or equipment applied with the electrochemical cell 100'.

In an exemplary embodiment, the electrochemical cell 100' may further include the negative current collector 24 disposed opposite to, e.g., to face, the electrolyte membrane 22 with respect to the negative electrode metal layer 23 disposed between. In such an embodiment, as shown in FIGS. 8A and 8B, portions of the positive electrode layer 21, the negative electrode metal layer 23, the electrolyte membrane 22 and the negative current collector 24 that are between the adjacent gas diffusion layers 25 may be bent by about 180 degrees such that the folded portions of the negative current collector 24 may be disposed to be adjacent to each other. In such an embodiment, the negative current collector 24 may be bent along with the positive electrode layer 21, the negative electrode metal layer 23 and the electrolyte membrane 22 about an imaginary bending axis that is closest to the negative current collector 24.

In an alternative exemplary embodiment, when the unit body of which the laminated body is bent one time is referred to as a bending body, the negative current collector is disposed to be close to the negative electrode metal layer and may be the film type or the plate type that is extended along the direction in which two or more bending bodies are arranged. In such an embodiment, the negative current collector may be disposed to respectively contact two or more bending body surfaces without being separated.

In another alternative exemplary embodiment of the electrochemical cell 100' the unit cell 20 having the plate shape, e.g., the shape shown in FIG. 1, and the unit cell 20' having the bent shape, e.g., the shape shown in FIG. 8, may be disposed opposite to, e.g., to face, each other with respect to the positive current collector 10. In such an embodiment, as described above, the unit cells 20 and 20' having different structures from each other may be disposed opposite to, e.g., to face, each other with respect to the positive current collector 10 depending on the application position of the electrochemical cell 100'.

Next, the uniform and linear distribution of the oxygen and the current of the electrochemical cell in an exemplary embodiment of the invention will be described with reference to FIG. 10 to FIG. 12.

Figure 10:
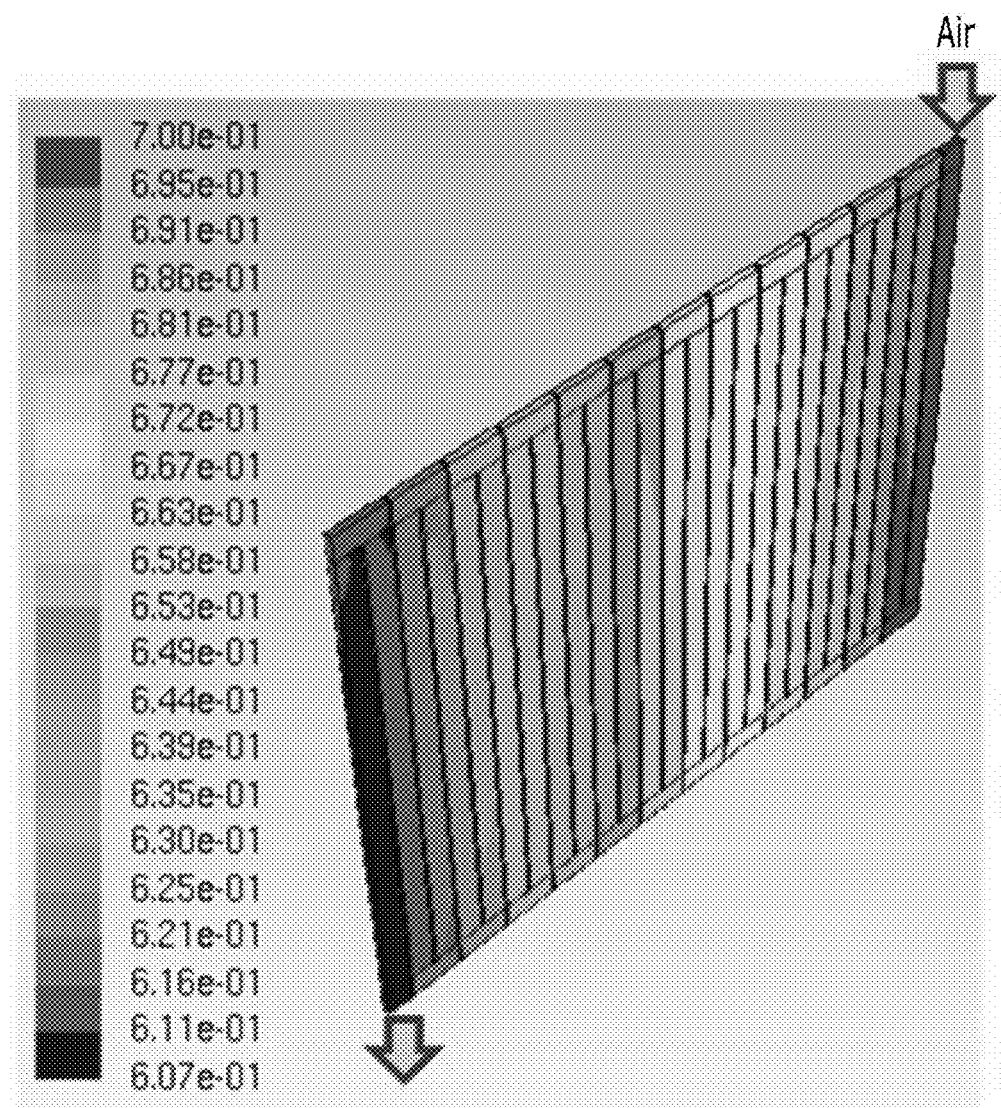
FIG. 10 is a view showing an oxygen concentration distribution for each position of a positive current collector of an electrochemical cell according to an exemplary embodiment of the invention.
Figure 11:
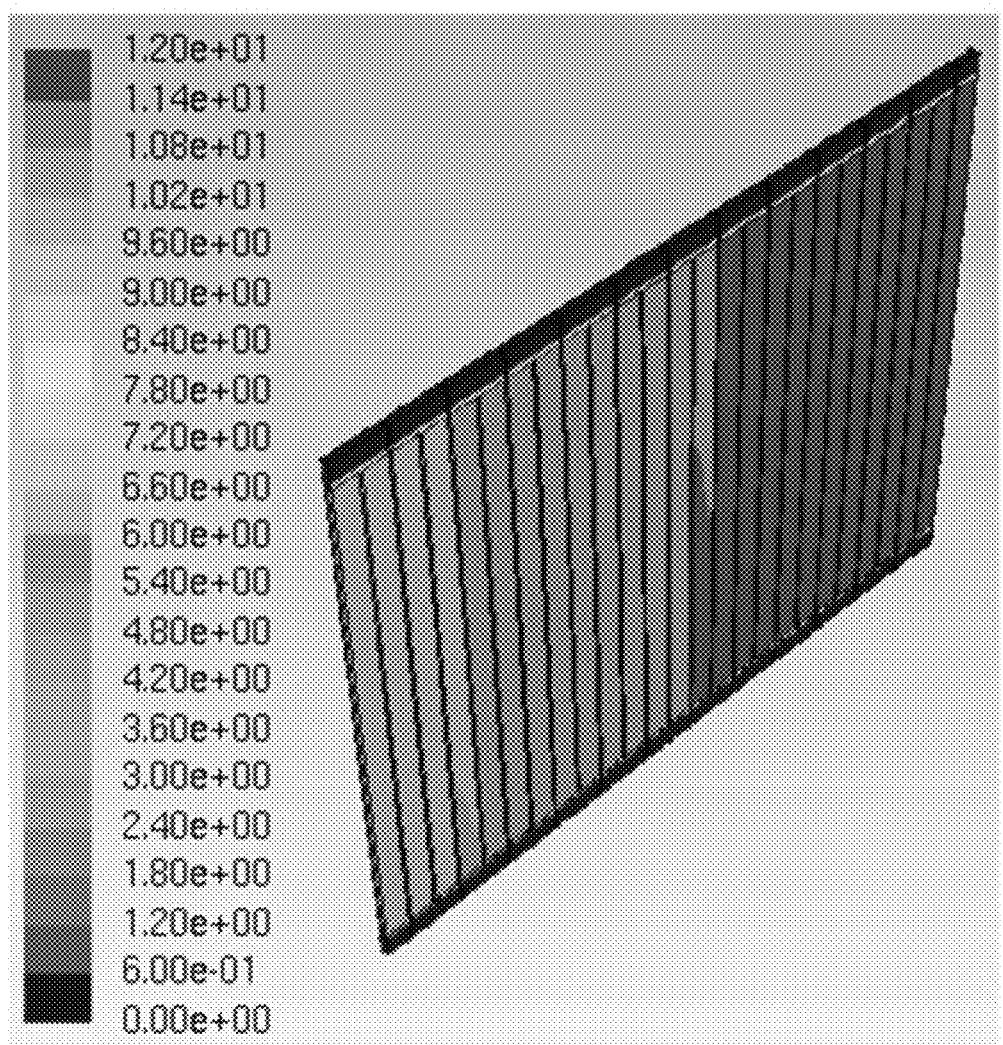
FIG. 11 is a view showing a current density distribution for each position of a positive current collector of an electrochemical cell according to an exemplary embodiment of the invention.
Figure 12:
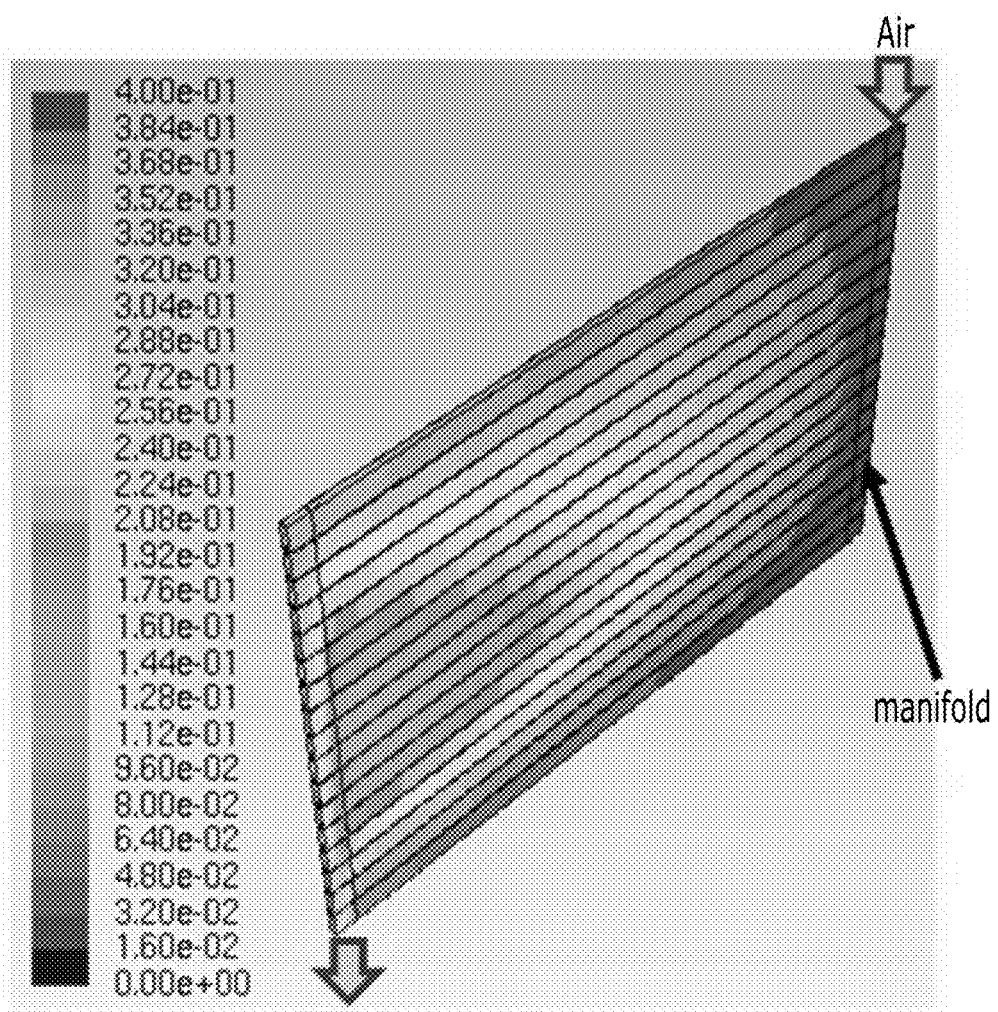
FIG. 12 is a view showing an oxygen concentration distribution for each position of a positive current collector according to a comparative example.

FIG. 10 is a view showing an oxygen concentration distribution on a positive current collector of an electrochemical cell according to an exemplary embodiment of the invention, FIG. 11 is a view showing a current density distribution on a positive current collector of an electrochemical cell according to an exemplary embodiment of the invention, and FIG. 12 is a view showing an oxygen concentration distribution on a positive current collector according to a comparative example.

In FIG. 10 to FIG. 12, a notation such as a number "e'''" (n is a real number) means "10'''" (n is a real number) as an index of 10.

Air with oxygen saturation of 70% and flow rate of $1.5 \times 10^{-5}$ m$^3$/s is injected into the electrochemical cell 100 of an exemplary embodiment, and a result of processing a flow analysis including the electrochemical reaction is shown in FIG. 10 (oxygen concentration distribution) and FIG. 11 (current density distribution).

As a comparative example, an electrochemical cell having a pair of unit cells substantially the same as the above-described embodiment except for a positive current collector structure in which two or more passages parallel to each other are formed therein and are connected with each other by a manifold to receive the air is provided. Next, the air with oxygen saturation of 40% and flow rate of $1.8 \times 10^{-5}$ m$^3$/s is injected into the manifold, and the result of processing the flow analysis including the electrochemical reaction is shown in FIG. 12 (oxygen concentration distribution).

In the case of the comparative example, among two or more parallel passages, as shown in FIG. 12, the oxygen concentration in the passages positioned at the upper side and the lower side is relatively uniform, but the oxygen concentration is rapidly decreased in the central area of positive current collector toward downstream. In the comparative example, the difference in the oxygen concentration distribution appears for each passage, and the linear and uniform oxygen supply does not manifest.

In the comparative example, the air supplied through the manifold of the injection part side may not be uniformly supplied to each passage. That is, among two or more parallel passages, the flow rate is relatively decreased inside the passage near the central area of positive current collector, an oxygen residence time is thereby increased, which increases an oxygen consumption amount by the electrochemical reaction, thereby causing deterioration of the uniformity of the oxygen concentration and the current density distribution.

Accordingly, when the positive current collector includes two or more paths with the manifold additionally designed to uniformly supply the air, the volume of the entire electrochemical cell is increased and the energy density for the total volume is deteriorated.

In an exemplary embodiment of the electrochemical cell, when the air is injected into the injection part, the air flows in the ejection part direction along the meandering path of the passage. In such an embodiment of the electrochemical cell, as shown in FIG. 10 and FIG. 11, the oxygen concentration and the current density may be substantially linearly and uniformly distributed away from the side closer to the injection part.

In such an embodiment, as a passage that defines a single path having the meandering shape is formed or defined inside the positive current collector of the electrochemical cell, the linearly uniform oxygen supply to the positive electrode layer may be realized, and accordingly the relatively uniform discharge characteristic may be obtained for the positive electrode layer.

In an exemplary embodiment, as shown in FIG. 11, the current density in the part of the top and the bottom of the positive current collector appears as zero (0), which is understood to be because the current density is simulated in the state that the part except for the top and the bottom of the positive current collector is covered by a pair of unit cells.

However, in an exemplary embodiment where the unit cell may be disposed to cover the entire region of the positive current collector, the current density may be linearly and uniformly distributed like in FIG. 11.

In an exemplary embodiment, as described above, the electrochemical cell has the linearly uniform discharge characteristic by providing a single passage having the meandering shape inside the positive current collector, thereby realizing the electrochemical cell having the high energy density.

Next, a battery module and battery pack including the electrochemical cell according to an exemplary embodiment of the invention will be described with reference to FIG. 13 and FIG. 14.

Figure 13:
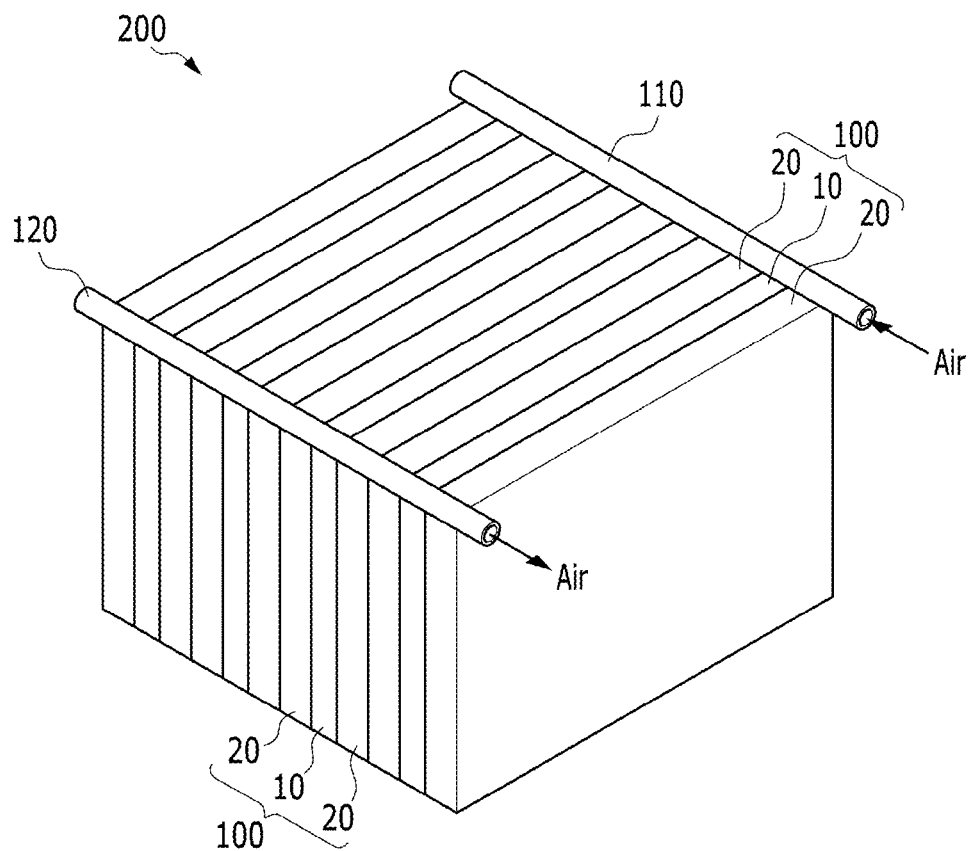
FIG. 13 is a perspective view showing a battery module including two or more electrochemical cells according to an exemplary embodiment of the invention.

FIG. 13 is a perspective view showing a battery module including a plurality of electrochemical cells according to an exemplary embodiment of the invention.

An exemplary embodiment of the battery module 200 has a structure in which a plurality of electrochemical cells 100 is disposed to be adjacent to each other. Each injection part of the electrochemical cells 100 is connected with a supply manifold 110 for supplying the air, and each ejection part of the electrochemical cells 100 is connected with an exhaust manifold 120 for exhausting the exhaust gas.

In an exemplary embodiment, as shown in FIG. 13, the electrochemical cells 100 may be disposed to be electrically coupled in parallel to each other, but not being limited thereto. In an alternative exemplary embodiment, arrangements of the electrochemical cells 100 may be variously modified depending on a usage of the battery module 200. In one exemplary embodiment, for example, the electrochemical cells 100 may be disposed to be electrically coupled in series to each other, or a part of the electrochemical cells 100 may be coupled in series and another part of the electrochemical cells 100 may be coupled in parallel.

In an exemplary embodiment of the battery module 200, the direction that the air flows through the supply manifold 110 for supplying the air and the exhaust manifold 120 for exhausting the exhaust gas is not limited to the direction shown in FIG. 13, and a direction such as the same direction as or different directions from the direction shown in FIG. 13 may be various determined depending on the usage of the battery module 200, the installation environment, the connection relationship with the air supply device, or the exhaust gas exhausting device.

An exemplary embodiment of the electrochemical cell 100 includes a pair of unit cells 20 disposed opposite to, e.g., to face, each other with respect to the positive current collector 10 including the passage having the meandering shape such that a ratio of the passage volume to the entire volume of the positive current collector 10 may be maximized while the entire volume of the positive current collector 10 is not increased. Accordingly, the volume of the positive current collector including the passage may be relatively less compared with a conventional battery module in which two electrochemical cells having conventional structure are connected to be adjacent.

In such an embodiment, as the number of the electrochemical cells 100 is increased in the battery module 200, the battery module 200 may have high energy density, and the uniform discharge characteristic may be provided between the electrochemical cells 100 disposed in the battery modules 200, as described above. According to an exemplary embodiment, the battery module 200 with the high energy density and the uniform discharge characteristic between the electrochemical cells 100 may be provided.

Figure 14:
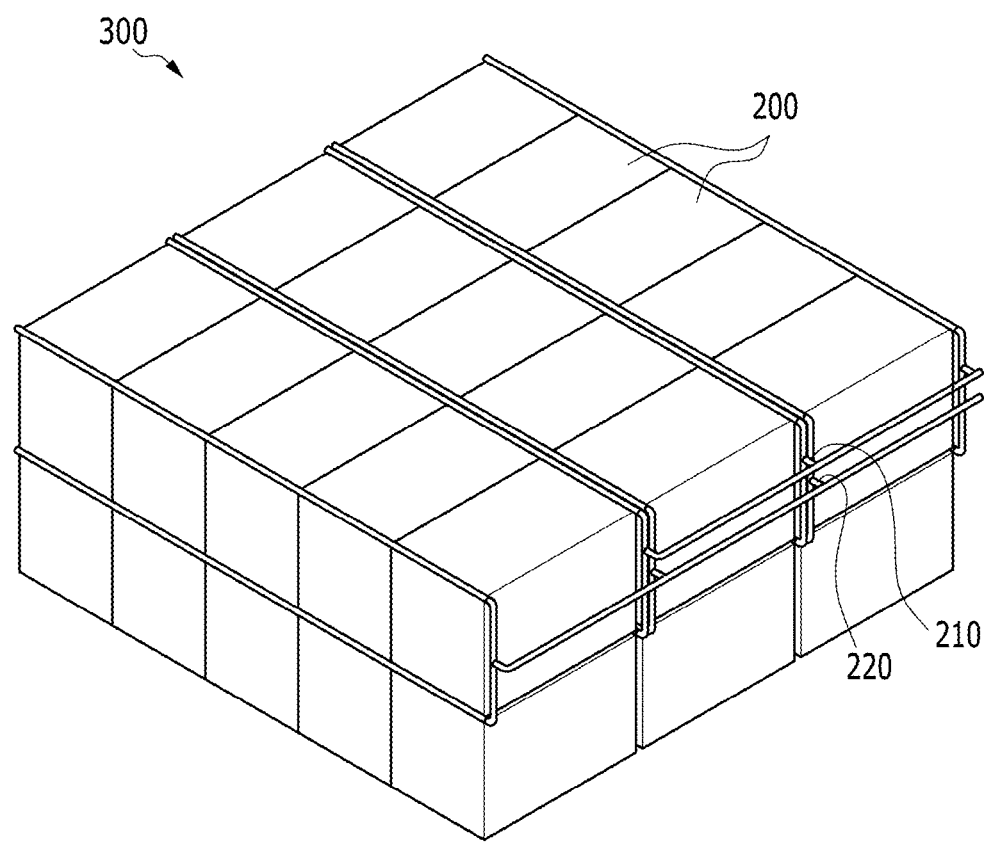
FIG. 14 is a perspective view showing a battery pack including two or more battery modules of FIG. 13.

FIG. 14 is a perspective view showing a battery pack including two or more battery modules of FIG. 13.

An exemplary embodiment of the battery pack 300 has a structure in which a plurality of battery modules 200 is disposed to be adjacent to each other. Each supply manifold of the battery modules 200 is connected to a supply part 210 for supplying the air, and each exhaust manifold of the battery modules 200 is connected to an exhaust part 220 for exhausting the exhaust gas.

In such an embodiment of the battery pack 300, as described above, the battery modules 200 having high energy density may be disposed to be adjacent. In such an embodiment of the battery pack, as shown in FIG. 14, a part in which the adjacent battery module 200 are coupled in series and a part in which the adjacent battery module 200 are coupled in parallel may be included. In an alternative exemplary embodiment, all of the battery modules 200 may be connected only in parallel or only in series. In an exemplary embodiment, the battery pack 300 may have a structure in which the battery module 200 is laminated in two or more layers.

The arrangement relationship between the supply part 210 and the exhaust part 220 inside the battery pack 300 may be variously modified depending on the usage of the battery pack 300, the installation place, and the connection relationship of the air supply device or the exhaust gas exhausting device.

In such an embodiment, the battery pack 300 may have the high energy density by disposing the battery modules 200 having the high energy density to be adjacent to each other, as the number of battery modules 200 in the battery pack 300 is increased.

In exemplary embodiments, as described above, the electrochemical cell 100 has the high energy density while easily supplying the air without increasing the cell volume, and simultaneously the battery pack 300 has the uniform discharge characteristic between the electrochemical cells 100 inside the battery modules 200 comprising the battery pack 300. In exemplary embodiments, the battery pack 300 having the high energy density for the total volume and the uniform discharge characteristic may be provided.

In exemplary embodiments, the battery module 200 and the battery pack 300 include a plurality of electrochemical cells 100 having the high energy density as described above, such that the battery module 200 and the battery pack 300 may be used as a large capacity battery with high energy density such as for an electric vehicle ("EV"), a hybrid electric vehicle ("HEV"), and an energy storage device ("ESS"), and may allow a slim and/or a compact design of EV, HEV and ESS to be effectively realized.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrochemical cell comprising:
a positive current collector, in which an injection part, an ejection part and a passage are defined, wherein air including an oxygen is injected through the injection part, an exhaust gas is ejected through the ejection part, and the passage defines a single path which connects the injection part and the ejection part; and
a unit cell disposed to be adjacent to the positive current collector, wherein the unit cell comprises:
- a positive electrode layer adjacent to the positive current collector, wherein the oxygen is an active material thereof;
- a negative electrode metal layer disposed opposite to the positive current collector with respect to the positive electrode layer; and
- an electrolyte membrane interposed between the positive electrode layer and the negative electrode metal layer, and wherein a portion of a surface of the positive electrode layer is directly exposed to the passage.

2. The electrochemical cell of claim 1, wherein the unit cell is provided as a pair and disposed opposite to each other with respect to the positive current collector.

3. The electrochemical cell of claim 1, wherein the passage has a meandering shape.

4. The electrochemical cell of claim 1, wherein the positive electrode layer contacts a surface of the positive current collector.

5. The electrochemical cell of claim 1, wherein the positive current collector comprises:
- a first frame comprising a plurality of first protrusions; and
- a second frame comprising a plurality of second protrusions,
  wherein the first protrusions and the second protrusions are disposed to be spaced apart from each other and opposite to each other.

6. The electrochemical cell of claim 5, wherein the first protrusions and the second protrusions are alternately disposed along a first direction.

7. The electrochemical cell of claim 5, wherein the first protrusions and the second protrusions have shapes corresponding to each other.

8. The electrochemical cell of claim 1, wherein the negative electrode metal layer comprises at least one selected from lithium, sodium, potassium, rubidium, cesium, zinc, calcium, magnesium, iron, aluminum, and a combination thereof.

9. The electrochemical cell of claim 1, wherein the electrolyte membrane comprises:
- a separation layer which has conductivity for a metal ion and blocks the oxygen; and
- an electrolyte which transmits the metal ion.

10. The electrochemical cell of claim 9, wherein the separation layer comprises a porous film, and the electrolyte is impregnated in pores of the porous film.

11. The electrochemical cell of claim 1, wherein the unit cell further comprises a negative current collector disposed opposite to the electrolyte membrane with respect to the negative electrode metal layer.

12. The electrochemical cell of claim 1, wherein the unit cell further comprises a gas diffusion layer disposed between the positive electrode layer and the positive current collector, and
a first surface of the gas diffusion layer contacts the positive current collector.

13. The electrochemical cell of claim 12, wherein the positive electrode layer, the negative electrode metal layer and the electrolyte membrane are bent to cover at least one of the remaining surfaces of the gas diffusion layer except for the first surface thereof.

14. The electrochemical cell of claim 12, wherein the gas diffusion layer is provided in plural and spaced apart from each other, and
the positive electrode layer, the negative electrode metal layer and the electrolyte membrane are repeatedly bent to cover all of the remaining surface surfaces of each gas diffusion layer except for the first surface thereof.

15. The electrochemical cell of claim 14, wherein the positive electrode layer, the negative electrode metal layer and the electrolyte membrane are bent by about 180 degrees at a position between adjacent gas diffusion layers in a way such that portions of the negative electrode metal layer are disposed to be adjacent to each other.

16. The electrochemical cell of claim 14, further comprising:
- a negative current collector disposed opposite to the electrolyte membrane with respect to the negative electrode metal layer, and
- the positive electrode layer, the negative electrode metal layer, the electrolyte membrane, and the negative current collector are bent by about 180 degrees at a position between adjacent gas diffusion layers in a way such that portions of the negative current collector are disposed to be adjacent to each other.

17. The electrochemical cell of claim 12, wherein the unit cell is provided as a pair and disposed opposite to each other with respect to the positive current collector.

18. A battery module comprising:
- the electrochemical cell of claim 1, wherein the electrochemical cell is provided in plural and disposed to be adjacent to each other;
- a supply manifold connected with the passage of each electrochemical cell to supply the air; and
- an exhaust manifold connected with the passage of each electrochemical cell to exhaust the exhaust gas.

19. A battery pack comprising:
- the battery module of claim 18, wherein the battery module is provided in plural and disposed to be adjacent to each other;
- a supply part connected with the supply manifold of each battery module; and
- an exhaust part connected with the exhaust manifold of each battery module.

* * * * *